(12) United States Patent
Luu

(10) Patent No.: US 6,766,952 B2
(45) Date of Patent: Jul. 27, 2004

(54) SIM CARD CARRIER

(75) Inventor: Daniel V. H. Luu, Irving, TX (US)

(73) Assignee: Quadnovation, Inc., Houston, TX (US)

( * ) Notice: Subject to any disclaimer, the term of this patent is extended or adjusted under 35 U.S.C. 154(b) by 39 days.

(21) Appl. No.: 10/159,114

(22) Filed: Jun. 3, 2002

(65) Prior Publication Data

US 2003/0085285 A1 May 8, 2003

Related U.S. Application Data

(60) Provisional application No. 60/330,979, filed on Nov. 6, 2001.

(51) Int. Cl.[7] .................................................. G06K 7/08
(52) U.S. Cl. ....................... 235/451; 235/486; 235/487; 235/492; 455/451; 455/462
(58) Field of Search ................................ 235/451, 492, 235/375, 441, 380, 382; 455/451, 462

(56) References Cited

U.S. PATENT DOCUMENTS

| | | | |
|---|---|---|---|
| 4,896,027 A | | 1/1990 | Drexler |
| 5,266,782 A | * | 11/1993 | Alanara et al. .............. 235/380 |
| 5,276,317 A | | 1/1994 | Ozouf et al. |
| 5,353,328 A | | 10/1994 | Jokimies |
| 5,514,862 A | | 5/1996 | Salzano |
| 5,581,065 A | | 12/1996 | Nishikawa et al. |
| 5,661,634 A | * | 8/1997 | Obata et al. ................. 361/684 |
| 5,790,659 A | | 8/1998 | Strand |
| 5,822,183 A | * | 10/1998 | Kanda et al. ................ 361/684 |
| 5,880,454 A | | 3/1999 | Monicault |
| 5,892,213 A | | 4/1999 | Ito et al. |
| 5,894,597 A | * | 4/1999 | Schwartz et al. ............ 455/558 |
| 5,933,328 A | | 8/1999 | Wallace et al. |
| 6,012,634 A | | 1/2000 | Brogan et al. |
| 6,068,186 A | * | 5/2000 | Jubert ......................... 235/441 |
| 6,075,706 A | * | 6/2000 | Learmonth et al. .......... 361/737 |
| 6,101,372 A | | 8/2000 | Kubo |
| 6,102,743 A | | 8/2000 | Haffenden et al. |
| 6,151,511 A | | 11/2000 | Cruciani |
| 6,179,649 B1 | | 1/2001 | An |
| 6,216,015 B1 | | 4/2001 | Hymel |
| 6,223,052 B1 | | 4/2001 | Ali Vehmas et al. |
| 6,244,894 B1 | * | 6/2001 | Miyashita ................... 439/500 |
| 6,275,383 B1 | | 8/2001 | Bohm |
| 6,292,561 B1 | | 9/2001 | Benson |
| 6,510,057 B2 | * | 1/2003 | Yap et al. .................... 361/752 |
| 6,518,927 B2 | * | 2/2003 | Schremmer et al. ........ 343/702 |
| 2001/0053634 A1 | | 12/2001 | Camacho |

FOREIGN PATENT DOCUMENTS

| | | |
|---|---|---|
| EP | 0 556 970 A1 | 8/1993 |
| EP | 1 077 578 A1 | 2/2001 |
| EP | 1 098 543 A1 | 5/2001 |
| EP | 1 102 411 A2 | 5/2001 |
| JP | 02-104219 | 1/1992 |
| WO | WO 99/27731 | 6/1999 |

\* cited by examiner

*Primary Examiner*—Michael G. Lee
*Assistant Examiner*—Steven S. Paik
(74) *Attorney, Agent, or Firm*—Dickstein Shapiro Morin & Oshinsky, LLP

(57) ABSTRACT

A carrier for at least one integrated circuit chip card or memory card, such as a plug-in sized SIM card, is preferably formed as a detachable cover fitted to or attached to the housing or battery pack of a portable electronic device. For example, the cover may be formed as a snap-on or slidably detachable cover over the back surface of a mobile telephone or the battery pack thereof. The cover includes at least one holder provided on the inwardly-facing surface of the detachable cover so that the extra chip cards are protected and hidden from view when the cover is attached to the portable electronic device. The holder(s) may be provided as a pocket, recess, hinged frame, or a contoured ridge or ridges formed on the interior surface of the cover. Alternatively, the carrier may also be formed as a carrier card having the holder(s) provided on a surface thereof.

31 Claims, 7 Drawing Sheets

SIM CARD CARRIER

This application claims priority from provisional application Ser. No. 60/330,979, filed Nov. 6, 2001, which is hereby incorporated by reference in its entirety.

BACKGROUND OF THE INVENTION

1. Field of the Invention

The present invention relates to a convenient holder for one or a plurality of electronic information storage or memory cards for use in portable electronic and communication devices, appliances.

2. Brief Description of the Related Art

Interchangeable information and/or memory cards are currently known and used in conjunction with many types of electronic devices, especially communication devices, for storing data, enabling secure access to a particular network or account, or configuring such devices to perform different functions. Such integrated electronic cards are typically made of plastic and have an electronic chip module mounted or embedded therein. The module is a semiconductor chip including an integrated circuit with memory, if appropriate, and contact or connection terminals for electrically connecting the terminals of the integrated circuit to the contact interface in the electronic device into which the card is inserted. The card body can be formed by injection molding or milling, and then the integrated electronic module is provided as a film by being rolled onto the card.

Examples of such electronic information and/or memory cards currently known in the art include Subscriber Identity Module cards (SIM cards), MultiMedia cards (MMCs), secure digital (SD) memory cards, SmartMedia™ cards, and Sony Memory Stick™.

SIM cards are most commonly used in communication devices such as mobile telephones to enable a user to access an individual account or a particular wireless telephone network in a specific country. Each SIM card contains the configuration information for a designated network, and also contains information identifying the user, such as the user's mobile telephone number. The identity or memory card is inserted into the body of the mobile telephone via a user-accessible interface, typically formed in or on a surface of the mobile phone housing, such as the surface which is covered by and contacts a detachable battery pack of the phone. When inserted into the telephone, the card is electrically connected to the internal circuitry of the mobile phone, thus enabling the mobile phone to access information from the identification/memory card.

Portable integrated electronic cards are typically provided with standardized dimensions with the chip positioned in a predetermined location relative to the edges of the card, depending on the type of electronic device. SIM cards are generally provided in one of two sizes, i.e., a full-sized or ISO size card, and a micro or plug-in sized card. The full sized card is approximately the size of a standard credit card, while the plug-in size is approximately 25 mm long and 15 mm wide, and less than 1 mm thick. To ensure correct orientation of a plug-in sized SIM card upon insertion in the mobile phone, one corner of the otherwise rectangular card is cut at an angle, so that the length of one edge of the card is reduced to about 21 mm while the width of the adjacent edge is reduced to about 12 mm. The card can only be inserted in the phone with an angled corner in the correct orientation.

Frequently, a mobile phone user must switch between two more different SIM cards depending on the nature of the communication being made with the mobile phone, or on the user's geographical location. In the first situation, the user might possess one SIM card for a corporate account, another card for personal use, and another as a prepaid phone card or other type of credit or debit card. In the second case mentioned above, the user must carry two or more SIM cards if travel between countries or territories is anticipated, because the mobile telephone networks used from country to country or territory to territory are often incompatible with each other, such as between countries in Europe and Asia. Accordingly, the user is required to carry at least one "extra" SIM card other than the one already operatively inserted into the mobile phone.

A problem with storing and carrying extra plug-in sized SIM cards is that the small size of the card renders them easily misplaced or damaged if stored with a collection of other small items, such as in a user's pocket or in a purse or bag. For this purpose, adapter cards have been developed which are formed similarly to the full-sized card except without the integrated circuit chip, so that the plug-in sized card may be inserted therein. Using such adapters, the plug-in sized card can often be inserted into a device which only accommodates full-sized card for use therein, and can be stored as a full-sized card in the credit card carrying section of the user's wallet.

One example of a holder for a plurality of SIM cards is disclosed in U.S. Pat. No. 5,514,862 to Salzano. In this prior art device, a carrier is constructed as a sleeve for encasing a full-sized SIM card, and includes a pocket formed on one side thereof for holding a plug-in sized SIM card. The carrier is designed to be carried in a user's wallet.

As with the SIM cards, if a user desires to perform more than one function or capability with the device or requires more storage than available on one of the MMC or SD memory card, it will be necessary for the user to carry and switch between two or more cards. The "extra" card(s) thus becomes a necessary accessory to the mobile phone or relevant communication device, wherein the "accessory" is carried in his or her wallet, purse, bag, luggage, etc. A significant disadvantage to such an arrangement is that the extra card carrier and hence extra card(s) is stored in a separate location from the communication device, which inherently increases the risk of misplacement or loss of the extra card(s), or being inaccessible to a user during an urgent need to find and/or use the extra card.

SUMMARY OF THE INVENTION

A first aspect of the present invention provides a means to carry and store at least one integrated circuit chip card in a convenient manner which is easily accessible to the user of a portable communication/electronic device.

A second aspect of the present invention provides a means to carry and store at least one integrated circuit chip card without having to carry an extra device or carrier in a separate location from the portable communication/electronic device where the extra card(s) may become easily lost or damaged.

A third aspect of the present invention provides a convenient means to carry and store extra plug-in sized SIM cards without the use of an adapter to convert the plug-in sized card to the dimensions of a full-sized card.

The present invention overcomes the disadvantages encountered in the prior art discussed above by providing a carrier for at least one integrated circuit chip card, in which the carrier is formed as a detachable cover fitted to or attached to the housing or battery pack of a portable communication/electronic device such as a mobile telephone or a portable computer.

The cover may be formed as a snap-on or slidably detachable cover over the back surface of a mobile telephone or the battery pack thereof, and includes at least one holder provided on the inwardly-facing surface of the detachable cover so that the extra cards are protected and hidden from view when the cover is attached to the portable communication/electronic device.

The holder(s) may be provided as a pocket, recess, hinged frame or contoured region formed on the interior surface of the cover.

Other features and advantages of the present invention will become apparent from the following description of the invention which refers to the accompanying drawings.

DETAILED DESCRIPTION OF EMBODIMENTS OF THE INVENTION

Figure 1:
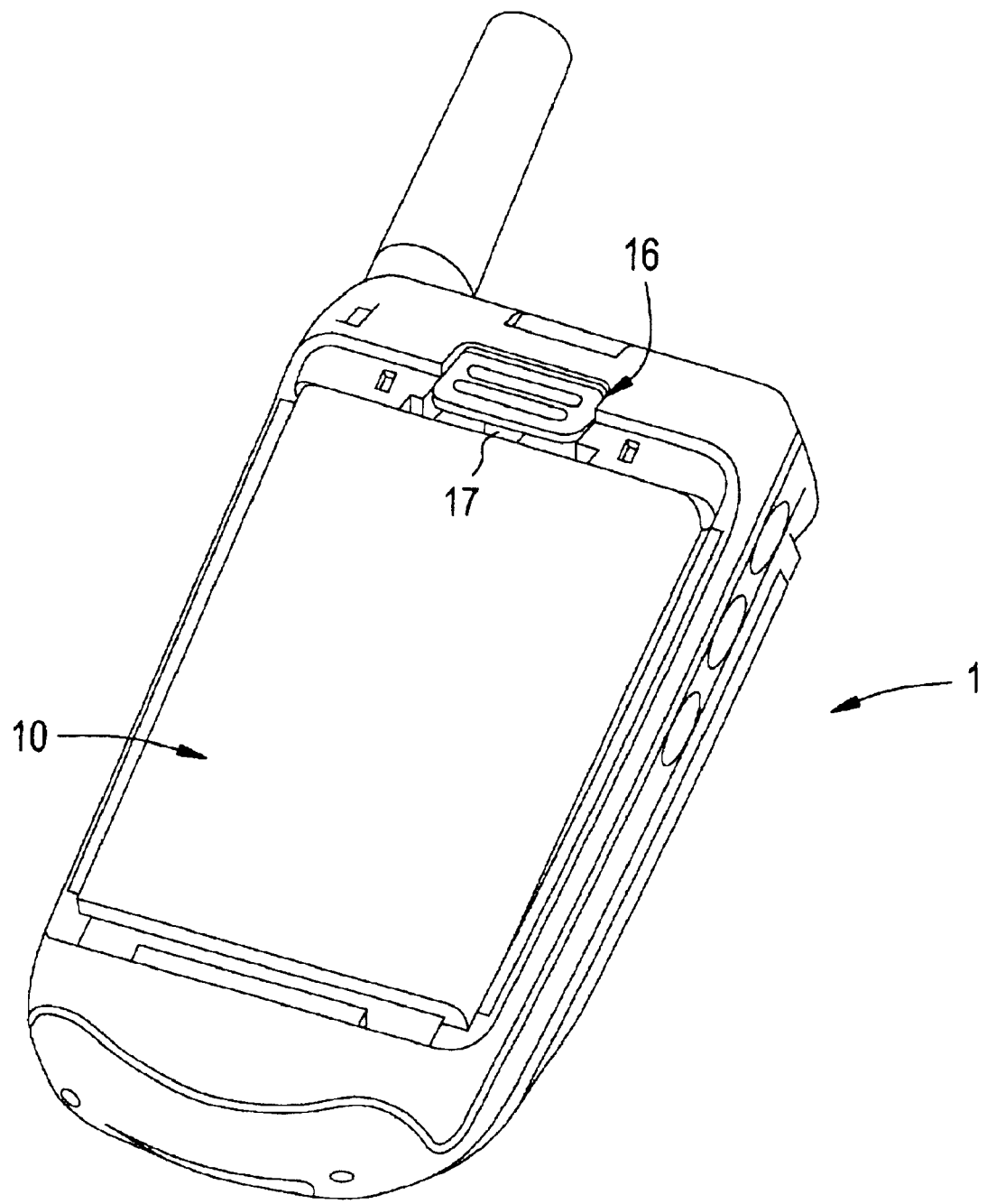
FIG. 1 shows an example of the SIM card carrier of the present invention attached to the exterior surface of a mobile telephone.

FIG. 1 shows the integrated circuit chip card carrier 10 in accordance with the present invention attached to a mobile telephone 1. The carrier is generally formed as a cover 12 defining an interior space having a thickness sufficient to accommodate the thickness of a chip card 50 and a holder into which the chip card is inserted. Preferably, the interior space and holder are dimensioned to accommodate a plug-in sized SIM card, but can be adapted for other types, sizes and shapes of integrated circuit cards, memory cards, or transaction cards.

Figure 2:
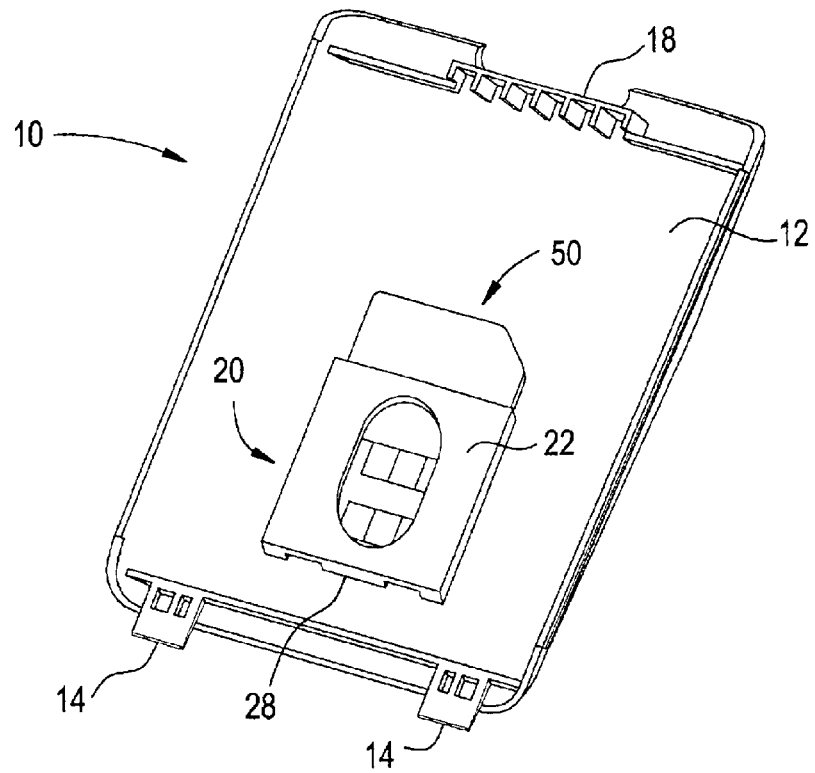
FIG. 2 shows a SIM card carrier in accordance with a first preferred embodiment of the present invention having a SIM card placed in the holder.

As can be seen in FIG. 2, inter alia, chip card carrier 10 includes stationary tabs 14 formed along the bottom edge thereof for engaging with corresponding slots formed in the housing of mobile telephone 1. As seen in FIG. 1, cover 12 is attached to mobile phone 1 along the top edge of cover 12 by a latch mechanism controlled by resilient pushtab 16. An upwardly-facing hook-type latch 17 is formed at the base of pushtab 16, which catches under a ledge 18 formed along the inner surface at the top edge of cover 12 when cover 12 is attached to mobile phone 1. Alternatively, pushtab 16 and latch 17 can be formed on the top edge of cover 12, to catch a corresponding ledge formed on the housing of mobile phone 1.

Carrier 10 is attached to mobile phone 1 by inserting tabs 14 into the corresponding slots formed in the housing of mobile phone 1, and pressing the top edge of cover 12 against mobile phone 1 until latch 17 catches under ledge 18 of cover 12. Carrier 10 is detached from mobile phone 1 by pressing on pushtab 16 to release latch 17 from ledge 18, whereby cover 12 can be lifted off the surface of mobile phone 1 so as to disengage tabs 14 from their respective slots in the phone housing. The resiliency of pushtab 16 may be provided by a spring securing pushtab 16 to the mobile phone housing or to cover 12, or may be provided simply by the naturally deformable characteristic of a plastic material from which the tab is formed.

Depending on the handset style of the mobile telephone, particularly those in which a detachable battery unit forms the back cover of the phone housing, cover 12 may be constructed as an additional cover over the battery unit. In this variation, cover 12 may be formed with inwardly-facing detents or other protruding elements along the side edges of cover 12, for engaging corresponding grooves or slots formed on the battery unit or phone housing. Carrier 20 may then be slidable along the battery unit to engage and disengage carrier 20 into position on the phone and to remove the same.

Figure 3:
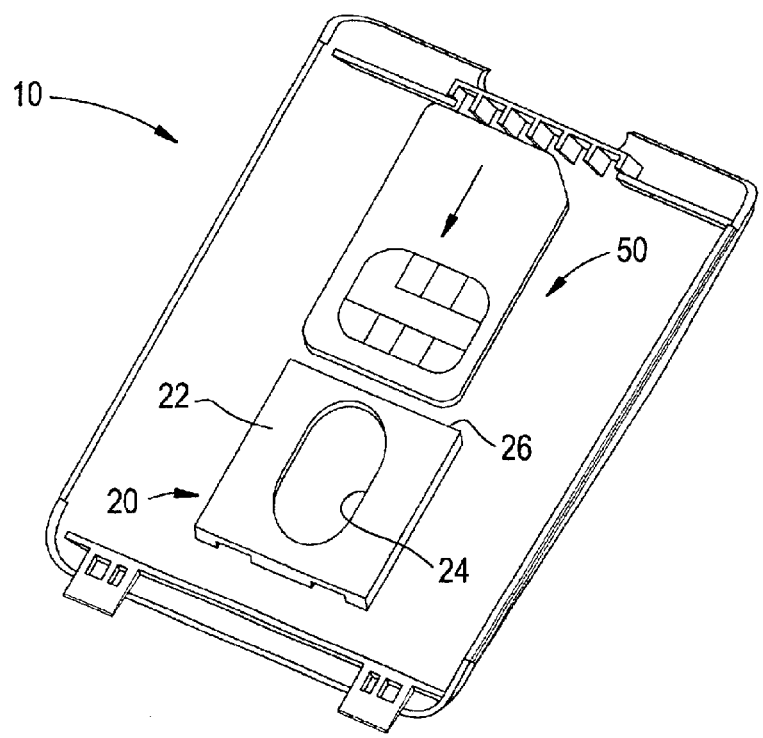
FIG. 3 shows the SIM card carrier of FIG. 2 and illustrating the insertion of a SIM card into the holder.

A first preferred embodiment of the integrated circuit chip card carrier according to the present invention is shown in FIGS. 2 and 3. In this embodiment, a holder for a plug-in sized SIM card is formed as a pocket 20 on the interior surface of cover 12. Pocket 20 is formed by an envelope 22 securely attached to the interior surface of cover 12, and is sealed or has a barrier along three of the four sides to prevent a chip card 50 inserted therein from sliding out. The width of envelope 22 is sized to snugly accommodate a plug-in sized SIM card 50 therein, and the height thereof is preferably slightly less than that of the SIM card 50 so that a SIM card inserted into pocket 20 does not inadvertently slip out. As mentioned above, however pocket 20 can be sized to accommodate any other type of IC chip card as desired and as enabled by the size and shape of carrier 10.

Envelope 22 also includes a window 24 large enough to enable the user to push an inserted chip card out of pocket 20 with a finger. Pocket 20 is positioned on the interior surface of cover 12 with its bottom end 28 close to one edge of cover 12 and pocket opening 26 positioned more towards the center of cover 12, relative to bottom end 28. Constructed in this manner, the chip card can be laid flush against the interior surface above the pocket opening 26 and slid into pocket 20, as shown in FIG. 3.

Figure 4:
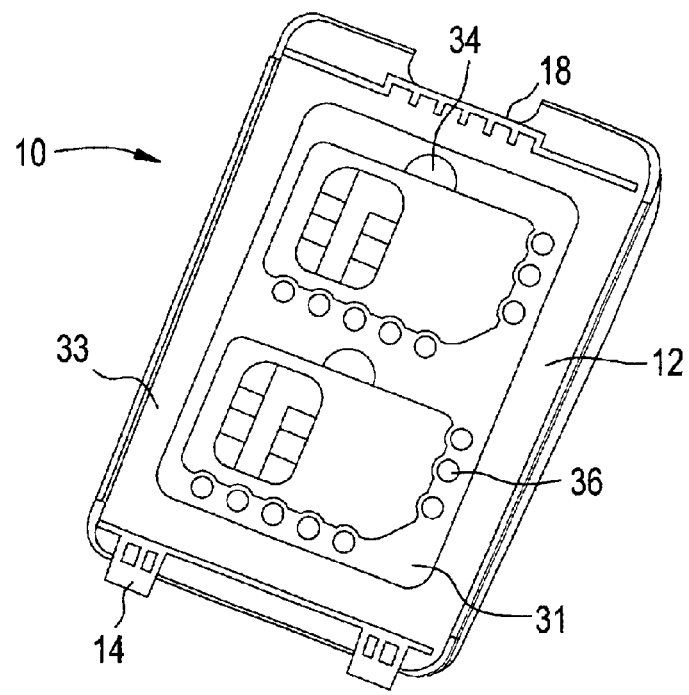
FIG. 4 shows a SIM card carrier in accordance with a second preferred embodiment of the present invention having two SIM cards placed in the holders.

A second preferred embodiment of the present invention is shown in FIG. 4. In this embodiment, an insert tray 30 is provided on the interior surface of cover 12, and lies flush with the perimeter 33 of the interior surface. Tray 30 includes at least one, and preferably two, recessed holder(s) 32 formed on the interior surface of cover 12.

Figure 5:
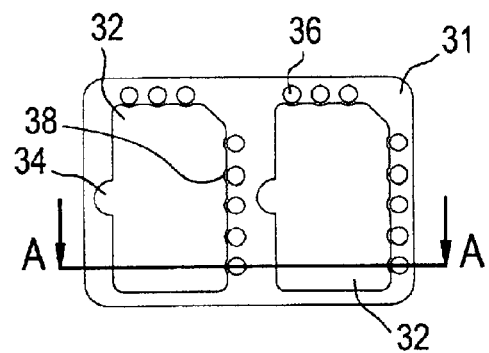
FIG. 5 shows the holders of the SIM card carrier of FIG. 4 having the SIM cards removed therefrom.

As can be seen more clearly in FIG. 5, each recessed holder 32 is sized and shaped to substantially correspond to the size and shape of a plug-in sized SIM card. As with the first embodiment, each recessed holder 32 may alternatively be sized and shaped to accommodate any other integrated circuit chip card or memory card as appropriate or desired. In this preferred embodiment, recessed holder 32 has a depth equal to that of a SIM card so that the surface of a SIM card inserted into holder 32 will lie flush with the interior surface of cover 12.

Figure 6:
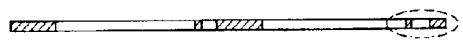
FIG. 6 is a cross-sectional view across the holders as seen through the plane A—A in FIG. 5.
Figure 7:
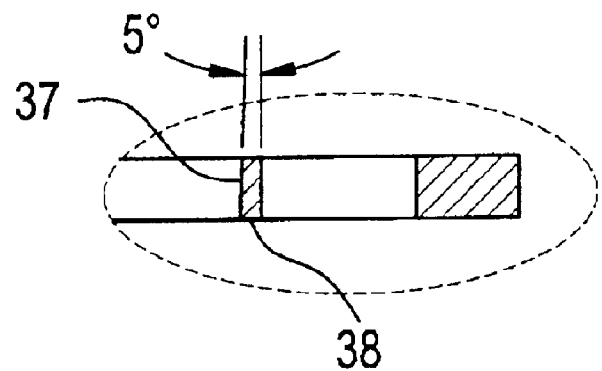
FIG. 7 is an enlarged view of the encircled region of FIG. 6, showing the retaining mechanism for the holder in the carrier of FIG. 4.

Along at least one side of the perimeter of recessed holder 32 and preferably along two sides, a plurality of holes or craters 36 are formed in tray 30, which are separated from recessed holder 32 by spring elements 38, as best seen in FIG. 7 showing an enlarged view of the encircled portion of the cross-section of tray 30 shown in FIG. 6. Spring elements 38 are preferably formed from the same resiliently deformable material from which tray 30 is made, and are thus continuous with the walls defining recessed holder 32. Spring elements 38 are biased inwardly toward the center of recessed holder 32, and function similarly to leaf springs. In the relaxed position, spring elements 38 protrude slightly into the space encompassed by the straight-edged dimensions of recessed holder 32, so that the dimensions of holder 32, when no chip card is placed therein, is slightly smaller than that of the type of chip card to be inserted.

Preferably, the surface of each spring element 38 which faces towards and contacts a chip card inserted into holder 32 is slightly angled away from the center of holder 32 relative to the vertical direction, e.g., approximately 5°. When chip card 50 is pressed into place into holder 32, the edge of chip card 50 slides downwardly along the angled face and pushes spring element 38 outwardly due to the lateral vector of the force exerted on the angled face. Without this feature, since the relaxed dimensions of holder 32 are slightly smaller than the dimensions of the chip card, insertion of the chip card into holder 32 would be more difficult because the edge of the chip card would bear down directly onto the top surface of spring element 38 with no lateral force vector generated by the downward pressure on the chip card to push spring element 38 outwardly.

Figure 8:
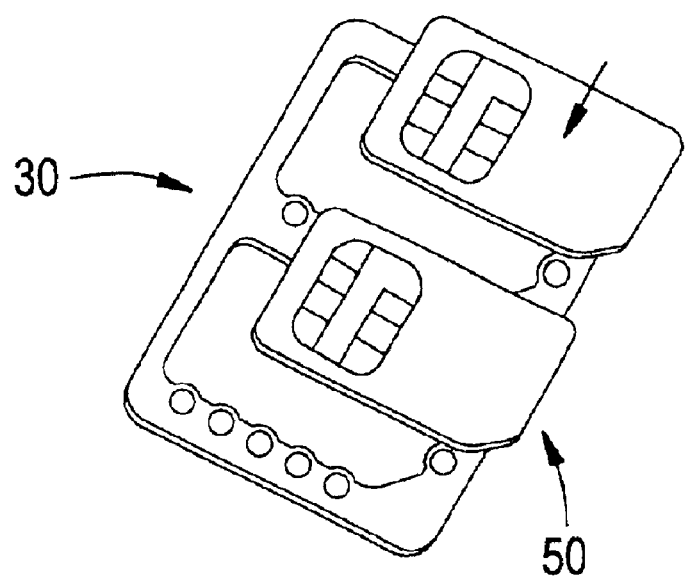
FIG. 8 illustrates the insertion of the SIM cards into the holders of the SIM card carrier of FIG. 4.

To insert a chip card 50 into recessed holder 32, the chip card 50 is merely aligned over the corresponding shape of recessed holder 32 and pressure is applied to the chip card 50 to push it against holder 32, as illustrated in FIG. 8. The pressure exerted on the chip card 50 and hence the angled face of spring elements 38 causes spring elements to flex outwardly away from the chip card 50, whereupon the chip card 50 is then snapped into place in holder 32. When the chip card 50 is inserted into recessed holder 32, therefore, spring elements 38 are held in tension against card 50 to securely hold it in holder 32.

Recessed holder 32 may include a recessed notch 34 extending from one side thereof for facilitating removal of a chip card inserted into the holder 32. The depth of notch 34 is preferably at least as deep as, and may be slightly deeper than the depth of recessed holder 32 to enable the user to catch the lower edge of the chip card with his or her finger to thereby pop the chip card Out of holder 32.

Alternatively, tray 30 may be formed of a rigidly deformable material such that an inserted chip card 50 can be released from holder 32 by simply pressing down on the periphery of holder 32. In this case, the release of chip card 50 is achieved by the pressure on tray 30, causing the material of tray 30 to bend slightly around the perimeter of holder 32, thereby forcing the chip card out of holder 32 due to the temporary change in shape of holder 32.

A variant of this embodiment also in accordance with the present invention is constructed by mounting or affixing tray 30 having at least one holder 32 onto the surface of a battery pack which faces the interior of the mobile telephone when the battery pack is mounted in place on the telephone housing.

Figure 9:
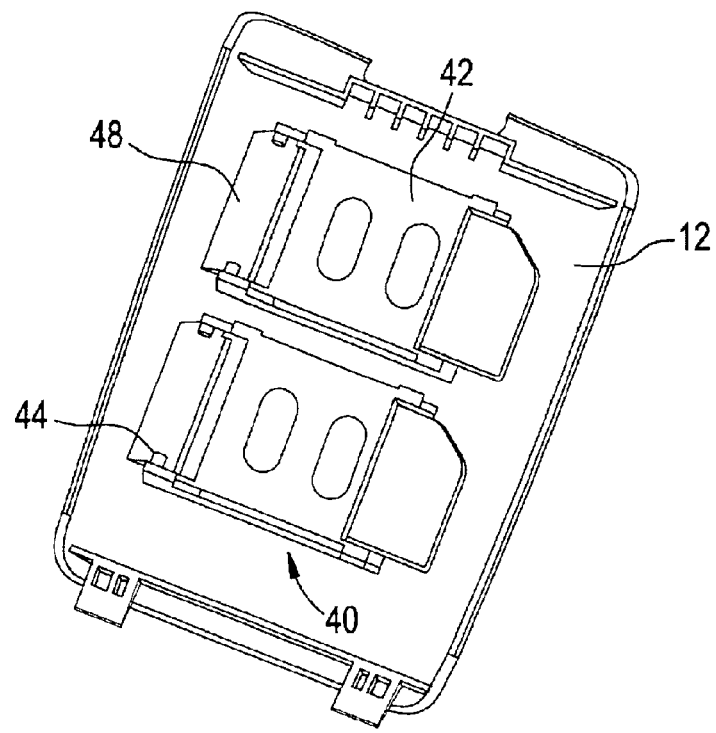
FIG. 9 shows a SIM card carrier in accordance with a third preferred embodiment of the present invention.
Figure 10:
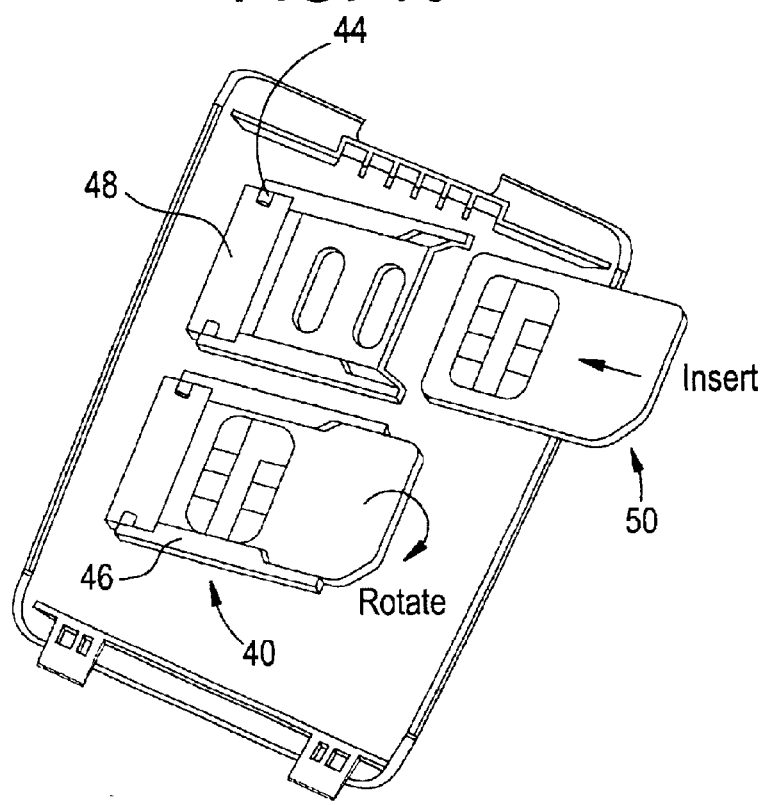
FIG. 10 illustrates the insertion of SIM cards into the SIM card carrier of FIG. 9.

A third preferred embodiment of the carrier according to the present invention is shown in FIGS. 9 and 10. In this embodiment, each holder 40 is formed as a support frame 42. As seen in FIG. 9, frame 42 is similar to envelope 22 of the first embodiment described above, except that frame 42 is not affixed directly onto the interior surface of cover 12 as is the case with envelope 22. Instead, frame 42 is hingedly attached to a fixation plate 48, which in turn is affixed to the interior surface of cover 12. In this preferred embodiment, frame 42 is sized to accept a plug-in sized SIM card inserted therein, and includes a main surface for covering a substantial portion of one side of an inserted SIM card 50, while flange portions 46 wrap around from the main surface to thereby form the sides of support frame 42 for holding an inserted SIM card 50. As with the first and second embodiments described above, frame 42 may alternatively be sized to accept an integrated circuit card or memory card other than a plug-in sized SIM card as shown in the figure.

Preferably, frame 42 is mostly open along one face of an inserted chip card, as can be seen in FIG. 10, for facilitating identification and removal of the inserted chip card in the holder 42. As illustrated in FIG. 10, frame 42 is pivotable around its hinged connection to fixation plate 48, for further facilitating insertion and removal of a chip card 50 into and out of holder 42.

Figure 11:
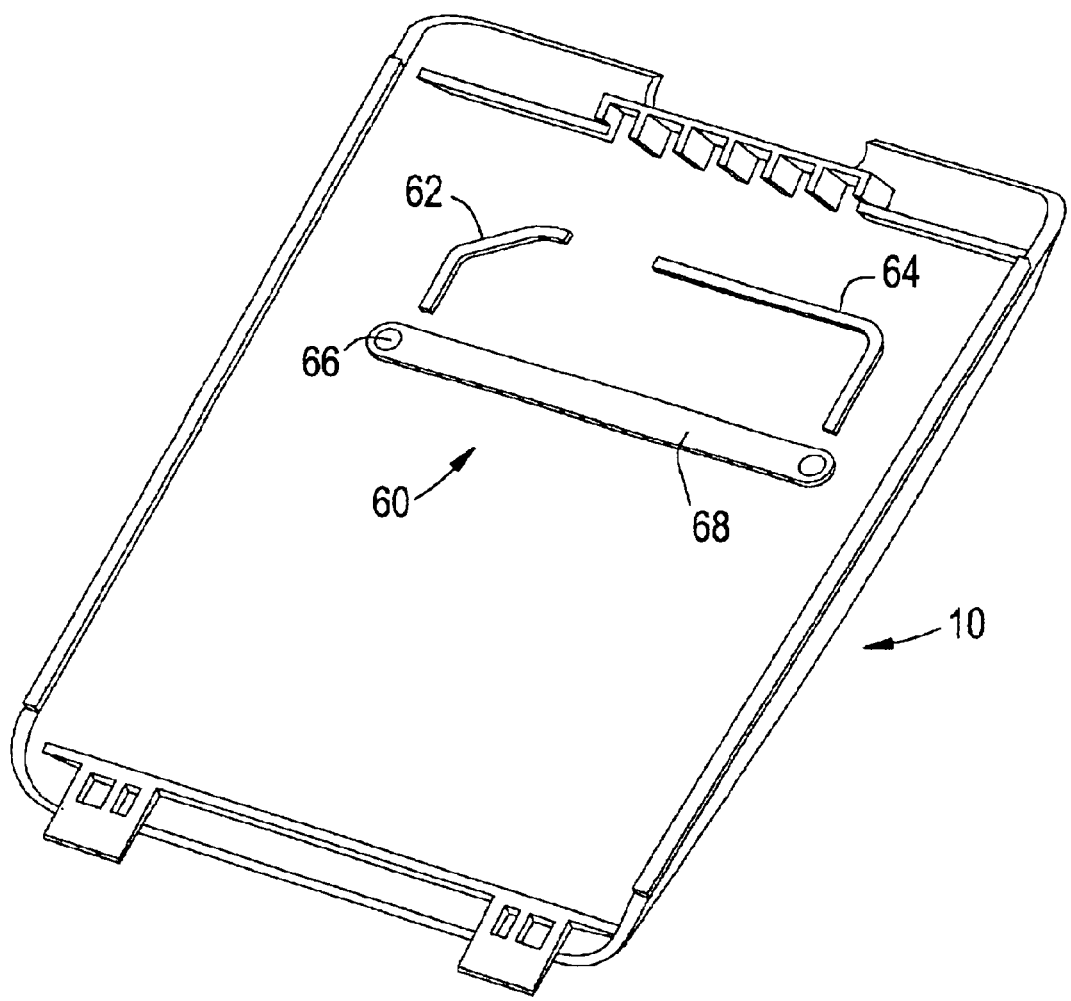
FIG. 11 shows a SIM card carrier in accordance with a fourth preferred embodiment of the present invention.
Figure 12:
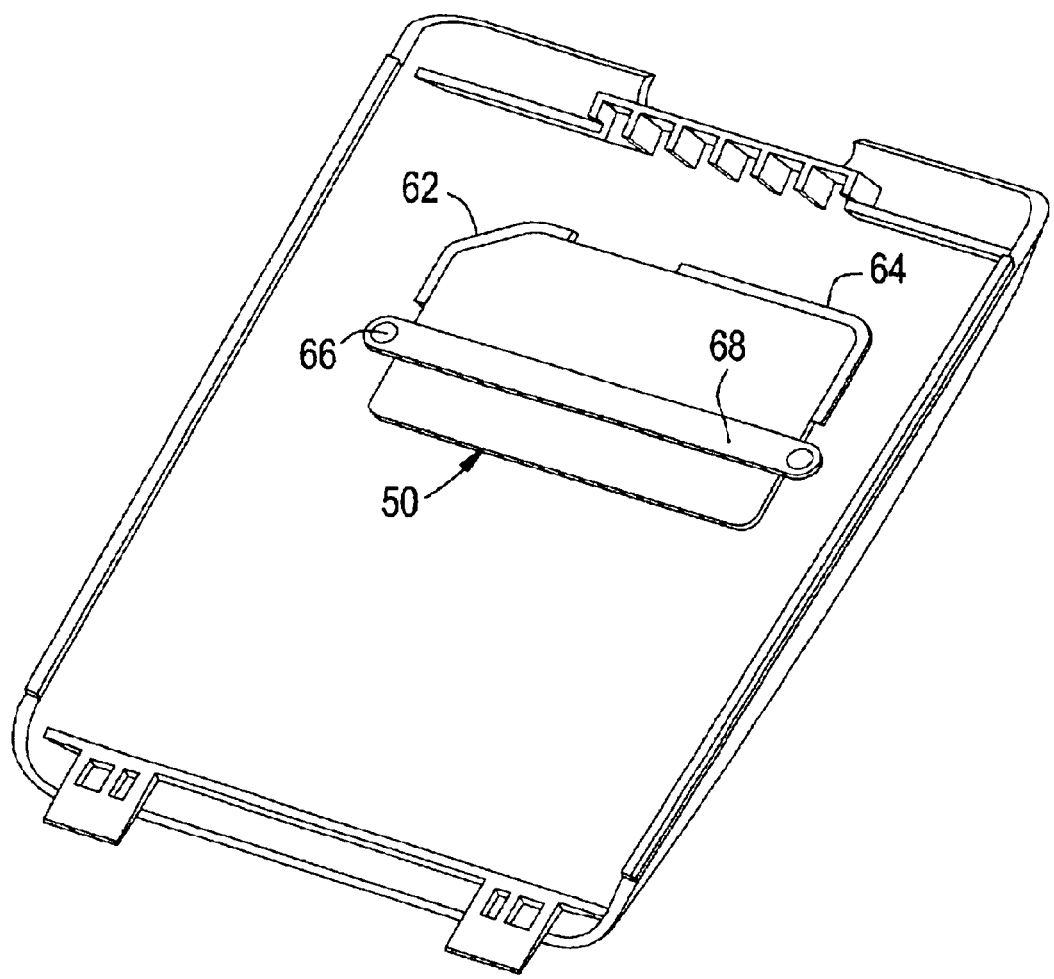
FIG. 12 shows the SIM card carrier of FIG. 11 having a SIM card placed in the holder thereof.

A fourth preferred embodiment of the carrier according to the present invention is shown in FIGS. 11 and 12. In this embodiment, ridges 62, 64 are formed on the interior surface of cover 12 which correspond in shape to the angled corner marking of SIM card 50 and an adjacent corner thereof. Ridges 62, 64 may have a height up to the thickness of SIM card 50, but may be lower. Ridges 62, 64 serve as positioning guides to maintain the position of a SIM card 50 inserted into holder 60 at a predefined location relative to cover 12. Of course, the shape of ridges 62, 64 are not limited to that of a plug-in sized SIM card, and instead can be contoured to conform to the size and shape of any other type of integrated circuit chip card or memory card as appropriate or desired.

A retaining strip 68 is affixed to the interior surface of cover 12 by posts 66 and spans from the vicinity of the end of ridge 62 to the vicinity of the end of ridge 64, across the space substantially encompassed between ridges 62, 64. The length of retaining strip 68 is at least equal to the corresponding length or width dimension of the integrated circuit chip card to be inserted. The surface of retaining strip 68 facing the interior surface of cover 12 is preferably situated at a height which is very slightly less than the thickness of the chip card to be inserted, to provide tension against the chip card when inserted into holder 60, but is not so low as to prevent insertion of the chip card into holder 60. Retaining strip 68 serves to securely hold an inserted chip card in place against ridges 62, 64 when the card is inserted into holder 60.

Ridges 62 and 64, posts 66, and retaining strip 68 are preferably constructed of the same materials used to form the interior surface of cover 12. Alternatively, retaining strip 68 may be made of a material having elasticity to enhance its retaining function.

A chip card 50 is inserted into holder 60 by orienting the card so that the angled corner marking is aligned with the position of ridge 62, and then sliding the chip card 50 under retaining strip 68 until the inserted corners of the card abut ridges 62, 64, as shown in FIG. 12. In manufacturing the cover 10 of this preferred embodiment, the orientation of holder 60 can be changed from the upper left side as illustrated in FIGS. 11 and 12 so that the angled corner marking of an inserted plug-in sized SIM card 50 is positioned to the upper right side of the cover, or so that the angled corner marking is positioned at the lower left or lower right corner of the holder. When the SIM card is to be inserted so that the angled corner marking is oriented toward the lower left or right corners of the holder, the retaining strip 68 is positioned above the ridges 62, 64 so that the SIM card 50 should be inserted from above the retaining strip 68.

In other variations of this embodiment, ridge 64 can be designed to conform to the corner adjacent the angled corner of a SIM card 50 in the short dimension as opposed to the long dimension. Similarly, ridge 62 can be positioned to orient the angled corner marking at the upper left, upper right, lower left, or lower right corner of holder 60. In a further alternative, ridges 62 and 64 conforming to the shape of adjacent corners of a SIM card can be joined to form a single ridge.

Each of the embodiments described herein can be adapted in shape and dimensions to accommodate different styles of mobile telephones. In this regard, depending on the size of carrier 10 each embodiment of the invention can be configured to store as many chip cards as can be physically accommodated on cover 12. Also, each of the carrier embodiments disclosed above may be provided as a cover for other devices, such as for a laptop or notebook computer, a palmtop or handheld computer (e.g., a personal digital assistant), or other type of portable electronic and/or communication device, instead of as a cover for a mobile phone.

Furthermore, each of the carrier and holder embodiments mentioned above may be adapted to carry, hold or store one or a plurality of any type of integrated circuit card, memory card, or transaction card, including but not limited to "contactless" type chip cards, dual mode ("contact" type and contactless type) cards, hybrid cards, etc., as may be enabled by the size of the carrier.

Further still, the carrier may be provided with an antenna formed on the same surface of the cover on which a holder is provided, with the antenna ends positioned at a location such that they would naturally line up with an integrated circuit chip on a contactless transaction module or card inserted into a holder provided on the carrier, to thereby enable contactless operation of the transaction module or card. Typically contactless-type transaction cards have been distributed to users in a form in which an antenna is permanently attached to the integrated circuit chip for enabling contactless transmission and reception of information to and from the chip, wherein the antenna is embedded in or integrally formed with the card provided to the user. This variation of the carrier, however, is usable in conjunction with a new type of contactless transaction card in which the integrated circuit chip portion, is provided separately or is detachable from the antenna. For example, in a cover for a portable electronic device having a holder as described above with reference to the fourth embodiment thereof, the antenna ends can be provided either on the interior surface of the cover or on the surface of the retaining strip such that when a contactless chip module is inserted into the holder, the contactless chip is automatically aligned with and comes into electrical contact with the antenna ends to thereby enable contactless operation of the contactless chip.

Alternatively, the carrier 10 may be formed as a carrier card having the dimensions of a full-sized ISO memory card or credit card. If the carrier is to be formed as a carrier card, the card is preferably made of a substantially rigid plastic having sufficient rigidity to resist crimping and folding, yet enough flexibility to withstand flexing such as would be encountered if the card were to be carried in a person's wallet or back pocket. Instead of providing the holder or holders on an interior-facing surface of the carrier, in this variant, the holder(s) are provided or supported on the major planar surface of one or both sides of the carrier card.

As described above, if the carrier (either as a cover or a carrier card) is large enough, it can include one or more holders each sized to accommodate a full-sized integrated circuit chip card or any other type of memory card having a different size and/or shape than those shown in the accompanying drawings.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A carrier for an integrated circuit chip card, comprising:
   a detachable cover for engaging a housing of a portable electronic and/or communication device over a battery unit attached to the device separately and independently from the cover, the cover having a first surface which faces exteriorly when the cover is engaged on a housing of a portable electronic and/or communication device, and a second surface which faces the housing of the device when the cover is engaged on a housing of a portable electronic and/or communication device; and
   at least one holder provided on the second surface of the cover, each of the at least one holder being sized and configured to passively store a chip card,
   wherein neither the cover nor any of the at least one holder includes any electrical contacts for enabling electronic access to information stored on a chip card placed into any of the at least one card holder.

2. The carrier according to claim 1, wherein the cover is configured to engage the housing of a mobile telephone.

3. The carrier according to claim 1, wherein the cover is configured to engage the housing of a palmtop computer or handheld computer.

4. The carrier according to claim 1, wherein the cover is configured to engage the housing of a laptop or notebook computer.

5. The carrier according to claim 1, wherein each of the at least one holder is sized and configured to hold a plug-in sized SIM card on the cover.

6. The carrier according to claim 1, wherein each of the at least one holder is sized and configured to hold a full-sized SIM card on the cover.

7. The carrier according to claim 1, wherein each of the at least one holder is formed as a pocket for receiving a chip card therein, the pocket being configured to securely hold a chip card inserted therein.

8. The carrier according to claim 1, wherein each of the at least one holder is formed as a recess on the second surface of the cover, each recess having dimensions substantially corresponding to the dimensions of a chip card for securely retaining a chip card on the cover.

9. The carrier according to claim 8, wherein each recess has a depth such that when a chip card is placed in the recess, the chip card lies flush with the second surface of the cover.

10. The carrier according to claim 8, wherein each recess includes a notch extending outwardly from one side of the recess for facilitating removal of a chip card inserted into the recess.

11. The carrier according to claim 8, wherein each recess includes at least one resilient retaining element formed along at least one side of the recess, each retaining element being biased toward the center of the recess so that when a chip card is placed in the recess, the chip card is securely held therein.

12. The carrier according to claim 11, wherein each recess includes at least one resilient retaining element formed along each of at least two sides of the respective recess.

13. The carrier according to claim 11, wherein each recess includes a notch extending outwardly from one side of the recess for facilitating removal of a chip card inserted into the recess, the notch being formed along a different side of the recess from the side or sides along which each of the at least one resilient retaining element are formed.

14. The carrier according to claim 1, wherein each of the at least one holder is formed as a frame structure pivotably mounted to the second surface of the cover, the frame structure being configured to receive and hold a chip card inserted therein.

15. The carrier according to claim 1, wherein each of the at least one holder includes a pair of ridges formed on the second surface of the cover, wherein the pair of ridges conform to the contour of two adjacent corners of a chip card; and
 a retaining strip affixed to the second surface of the cover at a position to span the dimension of a chip card determined by the two adjacent corners thereof corresponding to the pair of ridges, wherein the retaining strip is provided at a height above the second surface of the cover to enable insertion of a chip card into the holder and to securely hold the inserted chip card in place on the cover.

16. The carrier according to claim 15, wherein the pair of ridges conform to the contour of two adjacent corners of a SIM card, and wherein one of the ridges conforms to an angled corner of a SIM card.

17. The carrier according to claim 1, wherein each of the at least one holder includes
 a ridge formed on the second surface of the cover, wherein the ridge conforms to the contour of two adjacent corners and the intervening side of a chip card; and
 a retaining strip affixed to the second surface of the cover at a position to span the dimension of a chip card determined by the two adjacent corners thereof corresponding to the contoured ridge, wherein the retaining strip is provided at a height above the second surface of the cover to enable insertion of a chip card into the holder and to securely hold the inserted chip card in place on the cover.

18. The carrier according to claim 17, wherein the ridge conforms to the contour of two adjacent corners and the intervening side of a SIM card, and one of the corners is an angled corner of a SIM card.

19. A carrier for art integrated circuit chip card, comprising:
 a carrier card; and
 at least one holder provided on a surface of the carrier card, each of the at least one holders being formed as a recess on the surface of the carrier card, each recess having dimensions substantially corresponding to the dimensions of a chip card for securely retaining the chip card on the carrier card and further having a notch extending outwardly from one side of the recess for facilitating removal of a chip card inserted into the recess.

20. The carrier according to claim 19, wherein each recess has a depth such that when a chip card is placed in the recess, the chip card lies flush with the surface of the carrier card.

21. The carrier according to claim 19, wherein each recess includes at least one resilient retaining element formed along at least one side of the recess, each retaining element being biased toward the center of the recess so that when a chip card is placed in the recess, the chip card is securely held therein, and wherein the notch is formed along a different side of the recess from the side or sides along which each of the at least one resilient retaining element is formed.

22. The carrier according to claim 19, wherein the carrier card has substantially the same dimensions as a full-sized SIM card or a credit card.

23. The carrier according to claim 19, wherein each of the at least one holders is sized and configured to hold a plug-in sized SIM card.

24. A carrier for an integrated circuit chip card, comprising:
 a carrier card; and
 at least one holder provided on a surface of the carrier card, wherein each of the at least one holder is formed as a frame structure pivotably mounted on the carrier card, the frame structure being configured to receive and hold a chip card inserted therein.

25. The carrier according to claim 24, wherein the carrier card has substantially the same dimensions as a full-sized SIM card or a credit card.

26. The carrier according to claim 24, wherein each of the at least one holders is sized and configured to hold a plug-in sized SIM card.

27. A carrier for an integrated circuit chip card, comprising:
 a carrier card; and
 at least one holder provided on a surface of the carrier card, wherein each of the at least one holder includes at least one ridge formed on a surface of the carrier card, and which conform to the contour of two adjacent corners of a chip card; and
 a retaining strip affixed to the surface of the carrier card at a position to span the dimension of a chip card determined by the two adjacent corners thereof corresponding to the at least one ridge wherein the retaining strip is provided at a height above the surface of the carrier card to enable insertion of a chip card into the holder and to securely hold the inserted chip card in place in the holder.

28. The carrier according to claim 27, wherein the at least one ridge is a pair of ridges each conforming to the contour of a respective one of the two adjacent corners of a chip card.

29. The carrier according to claim 28, wherein the pair of ridges conform to the contour of two adjacent corners of a plug-in sized SIM card, and wherein one of the ridges conforms to an angled corner of a plug-in sized SIM card.

30. The carrier according to claim 27, wherein the at least one ridge is a single ridge conforming to the contour of two adjacent corners and the intervening side of a chip card.

31. The carrier according to claim 30, wherein the ridge conforms to the contour of two adjacent corners and the intervening side of a plug-in sized SIM card, and one of the corners is an angled corner of a plug-in sized SIM card.

* * * * *